(12) United States Patent
Reiman et al.

(10) Patent No.: US 8,025,330 B2
(45) Date of Patent: Sep. 27, 2011

(54) VEHICLE FAIRING STRUCTURE

(75) Inventors: James Reiman, Winnetka, IL (US); Peter Heppel, Port Louis (FR); Cory Worley, Chesterfield, MI (US)

(73) Assignee: Aerofficient, LLC, Winnetka, IL (US)

( * ) Notice: Subject to any disclaimer, the term of this patent is extended or adjusted under 35 U.S.C. 154(b) by 0 days.

(21) Appl. No.: 12/899,157

(22) Filed: Oct. 6, 2010

(65) Prior Publication Data

US 2011/0025092 A1 Feb. 3, 2011

Related U.S. Application Data

(60) Division of application No. 12/397,952, filed on Mar. 4, 2009, now Pat. No. 7,837,254, which is a continuation-in-part of application No. 11/684,097, filed on Mar. 9, 2007, now Pat. No. 7,604,284.

(51) Int. Cl.
*B62D 35/00* (2006.01)
(52) U.S. Cl. .................................. 296/180.4; 296/180.5
(58) Field of Classification Search ..... 296/180.1–180.5
See application file for complete search history.

(56) References Cited

U.S. PATENT DOCUMENTS

| | | | |
|---|---|---|---|
| 2,101,793 A | 12/1937 | Field, Jr. | |
| 3,415,566 A | 12/1968 | Kerrigan | |
| 3,711,146 A | 1/1973 | Madzsar et al. | |
| 3,834,752 A | 9/1974 | Cook et al. | |
| 3,934,922 A | 1/1976 | MacCready et al. | |
| 4,022,508 A | 5/1977 | Kirsch et al. | |
| 4,030,779 A | 6/1977 | Johnson | 296/180.4 |
| 4,036,519 A | 7/1977 | Servais et al. | |
| 4,057,280 A | 11/1977 | MacCready et al. | |
| 4,113,299 A | 9/1978 | Johnson et al. | |
| 4,142,755 A | 3/1979 | Keedy | |
| 4,156,543 A | 5/1979 | Taylor et al. | |
| 4,311,334 A * | 1/1982 | Jenkins | 296/180.4 |
| 4,316,630 A | 2/1982 | Evans | |
| 4,360,232 A | 11/1982 | Elder | |
| 4,401,338 A | 8/1983 | Caldwell | |
| 4,457,550 A | 7/1984 | Gielow et al. | |
| 4,518,188 A | 5/1985 | Witten | |
| 4,553,782 A | 11/1985 | Markland | |

(Continued)

*Primary Examiner* — Glenn Dayoan
*Assistant Examiner* — Gregory Blankenship
(74) *Attorney, Agent, or Firm* — Fitzpatrick, Cella, Harper & Scinto

(57) ABSTRACT

A fairing structure for a vehicle having a front vehicular component and a rear vehicular component in tandem and separated by a gap, comprising a top fairing surface adapted to be attached to the rear vehicular component, a first side surface adapted to be attached to a first side of the rear vehicular component, joining a first end of the top surface and generally perpendicular to the top surface, and a second side surface adapted to be attached to a second side of the rear vehicular component, joining a second end of the top surface opposite the first end and generally perpendicular to the top surface. Each of the top and first and second side surfaces has a proximal edge adapted to be positioned adjacent a vehicle, as well as a distal edge adapted to be positioned away from the vehicle with respect to the respective proximal edge. The proximal edges of the top and side surfaces attach to the leading top and side edges, respectively, of the front surface of the trailer box, so that an approximately uninterrupted surface is formed from the fairing structure to top and sides of the rear vehicular component. The area bounded by the distal edges of the surfaces is smaller than an area bounded by the proximal edges.

9 Claims, 5 Drawing Sheets

U.S. PATENT DOCUMENTS

| | | | | |
|---|---|---|---|---|
| 4,560,195 A | * | 12/1985 | Price et al. | 296/180.4 |
| 4,601,508 A | | 7/1986 | Kerian | |
| 4,611,847 A | | 9/1986 | Sullivan | |
| 4,682,808 A | | 7/1987 | Bilanin | |
| 4,685,715 A | | 8/1987 | Hardin | 296/180.3 |
| 4,688,841 A | | 8/1987 | Moore | |
| 4,693,506 A | | 9/1987 | Massengill | |
| 4,702,509 A | * | 10/1987 | Elliott, Sr. | 296/180.4 |
| 4,746,160 A | | 5/1988 | Wiesemeyer | |
| 4,779,915 A | | 10/1988 | Straight | |
| 4,824,165 A | | 4/1989 | Fry | |
| 4,904,015 A | | 2/1990 | Haines | |
| 5,078,448 A | | 1/1992 | Selzer et al. | |
| 5,190,342 A | | 3/1993 | Marlowe et al. | |
| 5,240,306 A | | 8/1993 | Flemming | 296/180.4 |
| 5,280,990 A | | 1/1994 | Rinard | |
| 5,332,280 A | | 7/1994 | DuPont et al. | |
| 5,375,903 A | | 12/1994 | Lechner | |
| 5,487,586 A | | 1/1996 | Kinkaide | |
| 5,595,419 A | | 1/1997 | Spears | |
| 5,658,038 A | | 8/1997 | Griffin | |
| 5,685,597 A | | 11/1997 | Reid | 296/180.1 |
| 5,791,724 A | | 8/1998 | Wasley | |
| 6,309,010 B1 | | 10/2001 | Whitten | 296/180.4 |
| 6,428,084 B1 | * | 8/2002 | Liss | 296/180.3 |
| 6,485,087 B1 | | 11/2002 | Roberge et al. | 296/180.5 |
| 6,793,273 B1 | | 9/2004 | Tuerk | |
| 6,799,791 B2 | | 10/2004 | Reiman et al. | |
| 6,886,882 B2 | * | 5/2005 | Farlow et al. | 296/180.4 |
| 6,986,544 B2 | | 1/2006 | Wood | |
| 7,008,005 B1 | * | 3/2006 | Graham | 296/180.4 |
| 7,055,890 B1 | | 6/2006 | Crean | |
| 7,073,845 B2 | | 7/2006 | Ortega et al. | |
| 7,234,761 B1 | | 6/2007 | Crean | |
| 7,318,620 B2 | | 1/2008 | Wood | |
| 7,404,592 B2 | | 7/2008 | Reiman et al. | |
| 7,604,284 B2 | | 10/2009 | Reiman et al. | |
| 7,837,254 B2 | | 11/2010 | Reiman et al. | 296/180.4 |
| 2003/0057736 A1 | | 3/2003 | Long et al. | |
| 2004/0239146 A1 | | 12/2004 | Ortega et al. | |
| 2008/0217957 A1 | | 9/2008 | Schoon et al. | 296/180.4 |
| 2009/0212595 A1 | | 8/2009 | Heppel et al. | 296/180.4 |
| 2009/0230726 A1 | | 9/2009 | Reiman et al. | 296/180.4 |

* cited by examiner

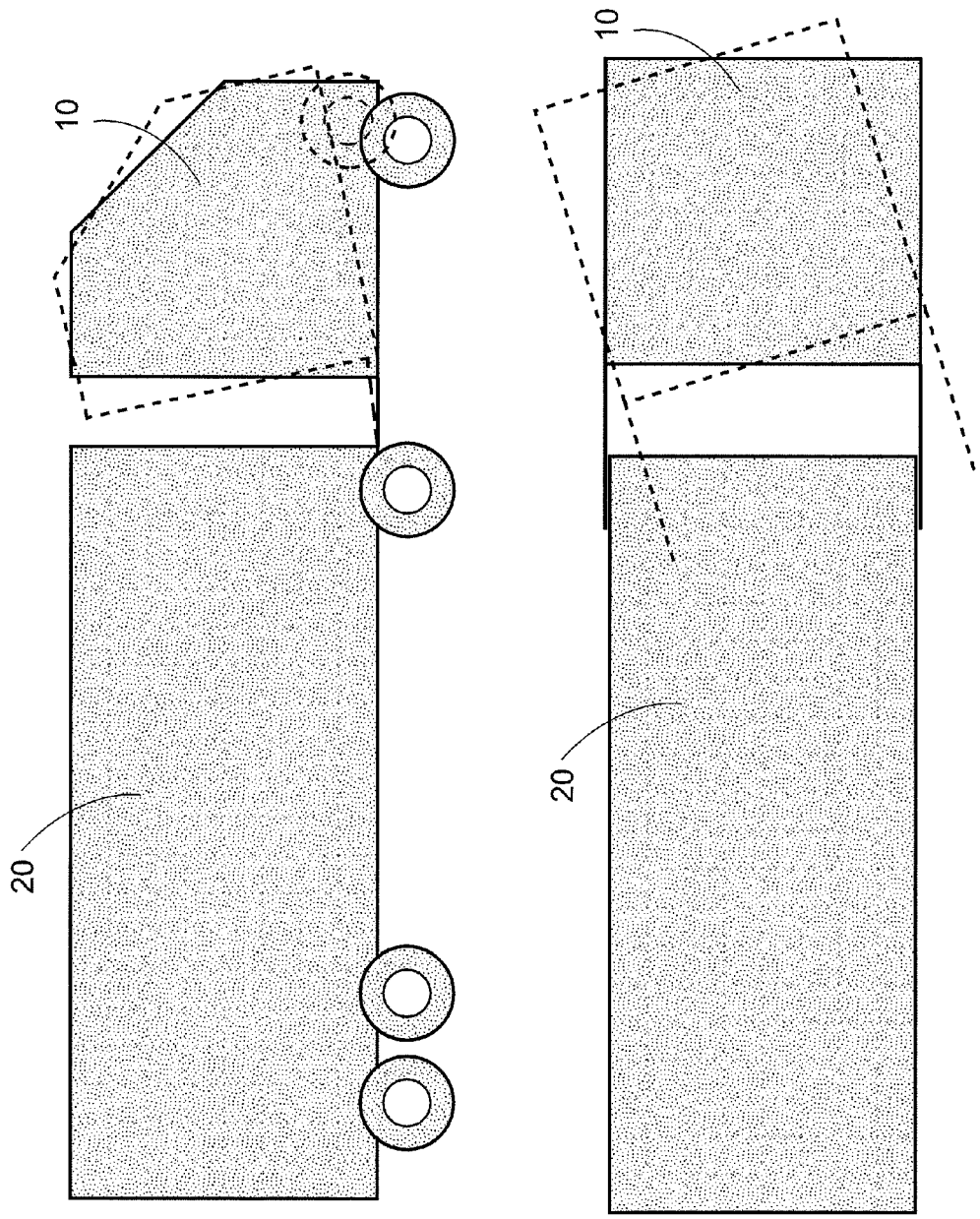

VEHICLE FAIRING STRUCTURE

This application claims the benefit of U.S. patent application Ser. No. 12/397,952, filed Mar. 4, 2009, which is a continuation-in-part of U.S. patent application Ser. No. 11/684,097, filed Mar. 9, 2007, both of which are incorporated by reference as if fully set forth herein.

BACKGROUND OF THE INVENTION

This invention relates to structures for improving the aerodynamic profile of vehicles, especially for the front end of a trailer box in a tractor-trailer combination.

DESCRIPTION OF RELATED ART

The amount of power needed to move a vehicle over land or through the air increases with the speed of the vehicle due to aerodynamic drag. The amount of power necessary to overcome aerodynamic drag directly translates into increased fuel consumption, and thus cost of operation and increased emission of greenhouse gasses and other pollutants.

A variety of innovations aimed at reducing the aerodynamic drag of various transport vehicles, including tractor-trailer combinations ("Truck(s)"), have been introduced in the prior art. These include efforts to make the hood, windscreen, fenders etc. more streamlined in form, as well as by adding fairings to the cab roof, and in some cases, to the trailer box ("Trailer").

U.S. Pat. No. 6,799,791 discloses a vehicle fairing structure that may be deployed on the rear of a trailer box. While this fairing structure significantly reduces drag at the rear end of the trailer box, a significant amount of drag is also associated with the front of the trailer box, and in particular in the gap between the Truck's tractor and trailer ("Gap").

Drag, and the resulting increased fuel consumption and emission of greenhouse gasses and other pollutants, is created at the Gap as a result of air circulating between the Truck's tractor and trailer, and also as a result of air which strikes the front, flat face of the trailer box.

Accordingly, fairing structures have been developed which strive to direct airflow away from the Gap and away from the front, flat surface of the trailer box. An example of such a device may be seen in U.S. Pat. No. 7,008,005.

For a variety of reasons, the strategy of directing airflow away from the Gap and front of the trailer box can achieve only modest improvements in drag reduction. In particular, such devices' efficiency is limited by their size; specifically, the devices need to be sufficiently small so that they do not interfere with normal truck operations. This size constraint limits the efficiencies that they may provide.

SUMMARY OF THE INVENTION

The current invention does not strive to ameliorate Gap drag by directing airflow away from the Gap and the front surface of the Trailer. Rather, it functions by filling the Gap with a "pressure bubble." As a result, the Gap ceases to exist and air is prevented from entering the area comprising the Gap and striking the front surface of the trailer box.

In particular, the current invention is a front vehicular fairing that includes a top fairing surface adapted to be attached to the front of the box of a Trailer, a first side surface joining a first end of the top surface and generally perpendicular to the top fairing surface, and a second side surface joining a second end of the top fairing surface opposite the first end and generally perpendicular to the top surface. Each of the top, first side and second side surfaces have a proximal edge adapted to be positioned adjacent the trailer, as well as a distal edge adapted to be positioned away from the vehicle. The proximal edges of the top and side surfaces attach to the leading top and side edges, respectively, of the front surface of the trailer box, so that an approximately uninterrupted surface is formed from the fairing structure to top and sides of the rear vehicular component. Further, the area bounded by the distal edges of the surfaces is smaller than the area bounded by the proximal edges.

By virtue of the foregoing design, the current invention is a device which traps air and creates an over-pressure area. Such over-pressure area acts to impede wind and airflow created by a moving Truck from penetrating the Gap, hence Gap related drag is either eliminated entirely or reduced. Concurrent with the reduction of Gap drag is a reduction of fuel consumed to overcome a Truck's aerodynamic drag and a concomitant reduction of greenhouse gasses and other pollutants emitted from the Truck's engine.

In addition, the current invention employs a design that takes into account the real-world conditions under which Trucks operate. For example, during operation, it is customary for a Truck's tractor to turn up to, and sometimes more than, 120 degrees, relative to the trailer. Likewise, during normal operation a Truck's tractor may pivot up relative to the trailer, as when entering a ramp, driveway access road, or the like. The present invention accordingly optionally utilizes resilient materials for the fairing panels, in order to permit the device to deform and spring back, with no permanent deformation, in the event the tractor should move against it.

In conjunction with use of the foregoing resilient fairing panel construction, or as an alternative to use of such construction, the preferred embodiment of the present invention employs hinges and springs to permit the device to bend away from the obstruction and spring back to its original position when the obstruction is removed.

Furthermore, if the tractor should touch the fairing in the region of the exhaust pipe(s) (which are often hot at their highest points where catalytic converters or other hot antipollution devices are often mounted), there is the risk of fire or damage. To address this risk, the current invention can include heat resistant properties in this area. Specifically, the top corner sections of the fairing comprising the present invention can be fabricated of or sheathed with a heat resistant and non-flammable material such as aluminum.

These and other advantages of the present invention are discussed further below.

BRIEF DESCRIPTION OF THE DRAWINGS

FIG. 5 shows the effect on the Gap size of a Truck's tractor initially ascending a steep incline, with the trailer still on the flat surface.

FIG. 6 shows the effect on the Gap size of a Truck's tractor executing a hard turn.

DESCRIPTION OF THE PREFERRED EMBODIMENTS

The preferred embodiment of the instant invention is a three sided airfoil that "traps" air within the Gap and creates a pressure bubble within the Gap that effectively fills the Gap, thereby reducing or eliminating aerodynamic drag caused by A) wind entering the Gap and striking the front flat surface of the trailer box 21 and B) vortices created by (i) differences in air pressure between the sides and top of the Truck's tractor and trailer, (ii) the space comprising the Gap, (iii) differences in air flow along the sides and top of the Truck's tractor and trailer, and (iv) differences in air flow in and around the space comprising the Gap.

Figure 1:
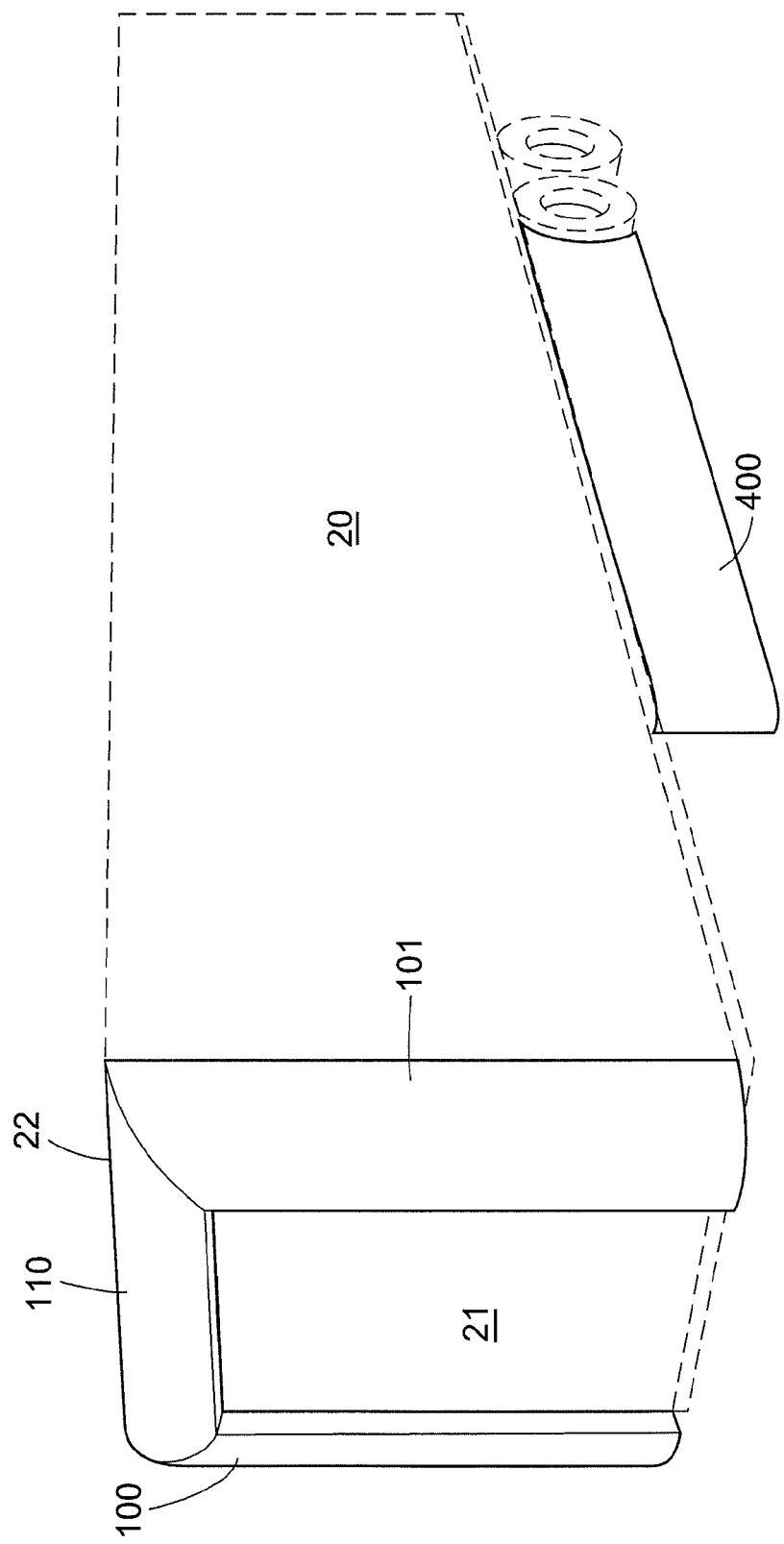
FIG. 1 is a perspective view of a trailer incorporating the invention on the front of the box of Trailer 20, and also showing a side fairing 400 along the side of the trailer box.
Figure 2:
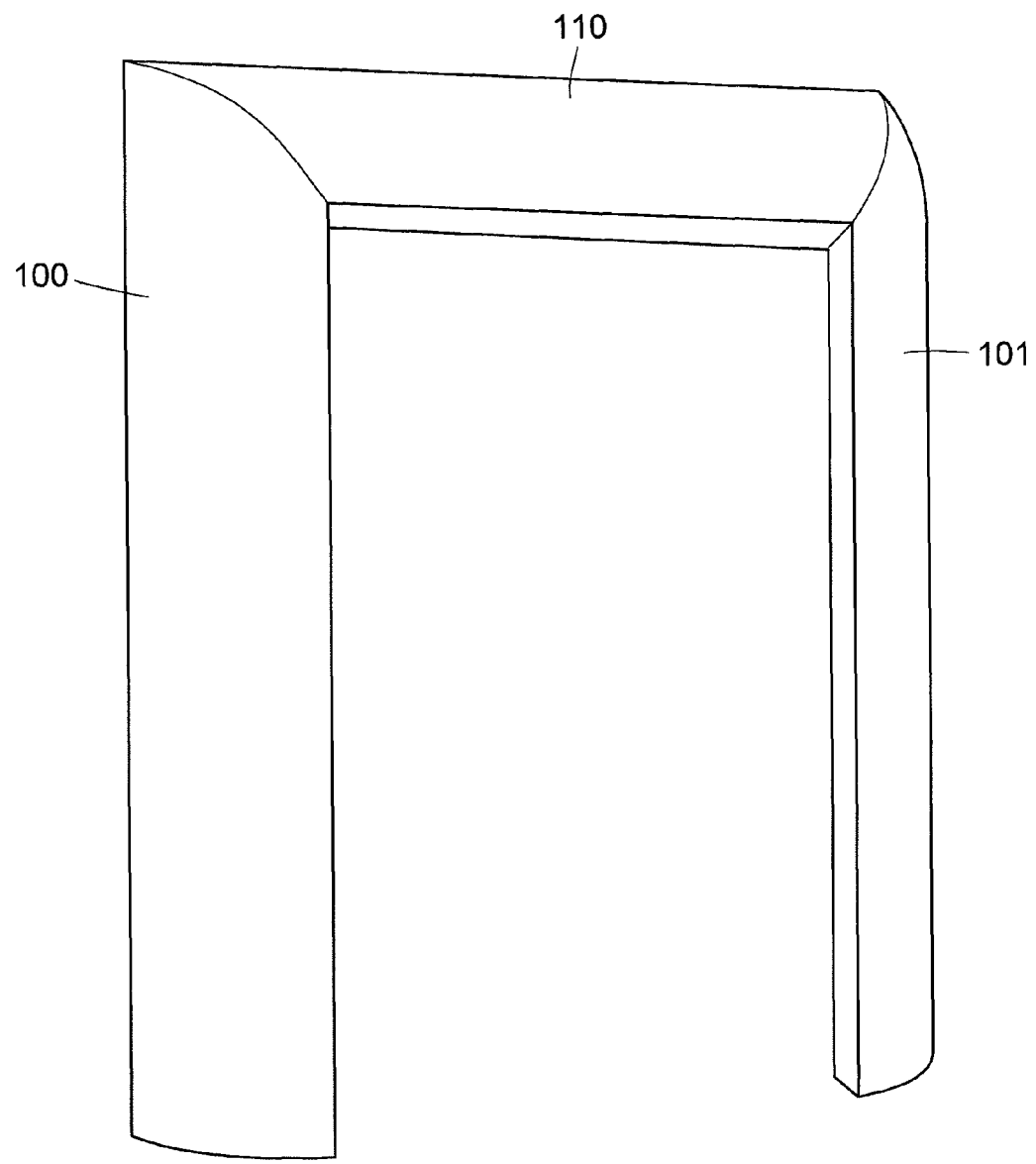
FIG. 2 is a detail of the preferred embodiment of a fairing structure according to the invention.
Figure 3:
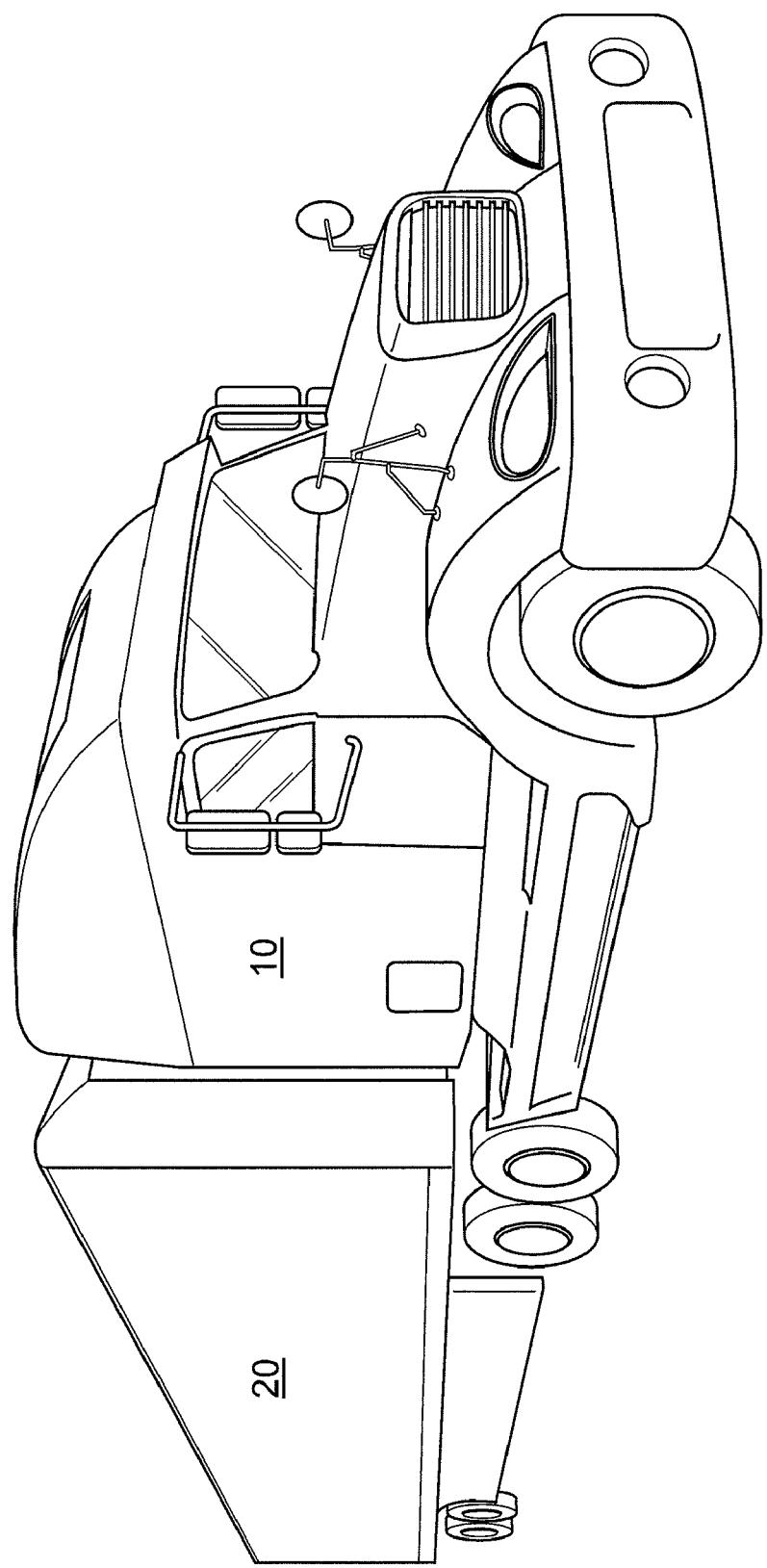
FIG. 3 is a perspective view of a tractor-trailer combination incorporating a fairing structure according to the invention.

FIGS. 1 and 2 depict a preferred embodiment of the present invention, comprising a three sided airfoil adjacent to, concurrent with, and forming a continuation of the sides and top of the box of Trailer 20.

With reference to FIG. 1, there is shown fairing side 100, which comprises one of the sides of the fairing in the preferred embodiment of the present invention. In the preferred embodiment, fairing side 100 is adjacent to, and forms a continuation of, the sides of the box of Trailer 20, and as can be seen, has a length (in the vertical direction) approximately equal to the exterior vertical distance from the bottom of the box of Trailer 20 to the top of the box of Trailer 20. Further, fairing side 100 is curved inwardly, in the forward direction. FIG. 1 also depicts fairing top 110, which abuts fairing side 100 proximate to the top 22 of box of Trailer 20. As can be seen, fairing side 100 is mitered to, and fits snugly against, fairing top 110.

FIG. 1 also depicts fairing side 101. Fairing side 101 is identical to fairing side 100, except its structure, dimensions and shape is a mirror of fairing side 100. Likewise, the position of fairing side 101 on front face 21 mirrors in location the position of fairing side 100.

FIG. 1 further depicts fairing top 110, which comprises the top portion of the preferred embodiment of the present invention. Fairing top 110 is positioned on front face 21 of box of Trailer 20 to be parallel to, and abut, the top 22 of the box of Trailer 20. The upper edge of fairing top 110 spans the width of the top 22 of the trailer box 21, and forms a continuation of the top 22 of the box of Trailer 20. The left and right edges of fairing top 110 (looking down from above) are mitered to fit snugly with fairing sides 100 and 101.

Figure 4C:
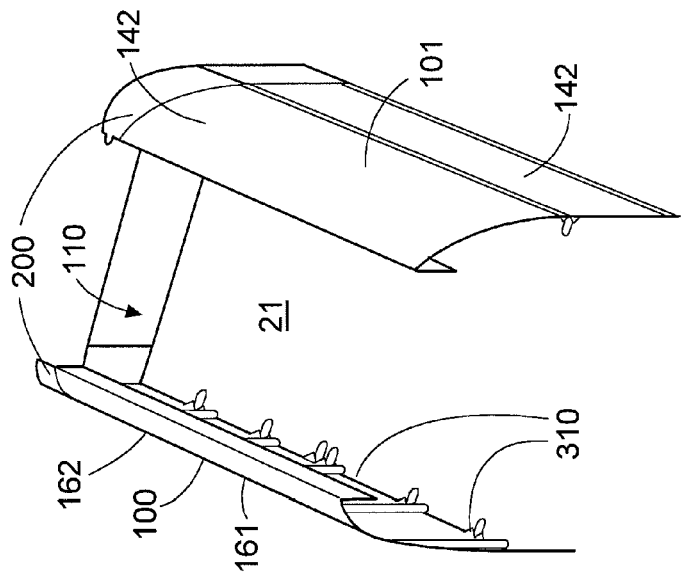
FIGS. 4A, 4B, and 4C show several details of the preferred embodiment of the present invention.
Figure 4B:
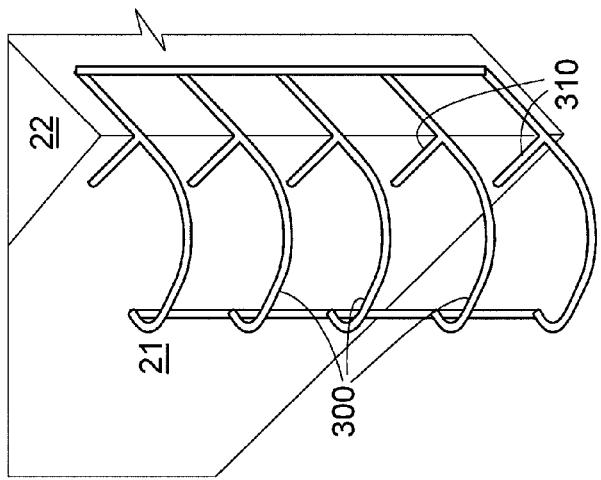
Figure 4A:
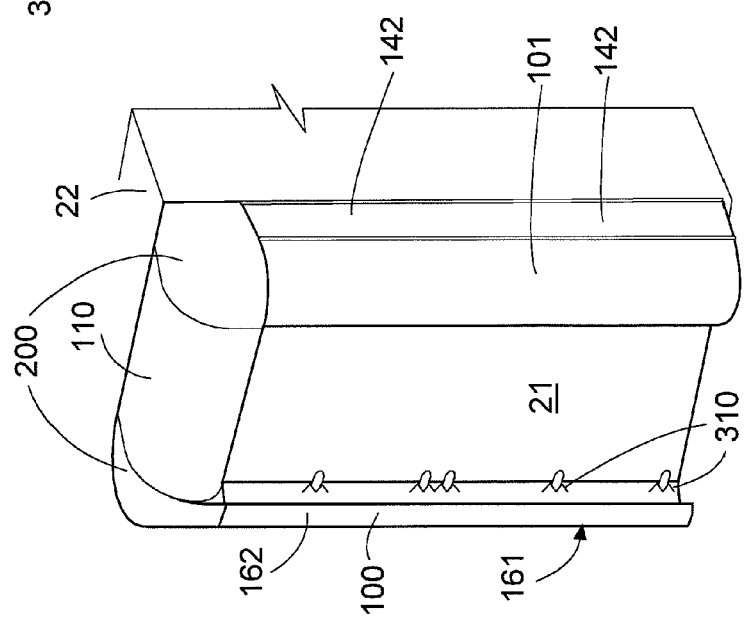

To support fairing sides 100 and 101, ribs fabricated in the shape of the fairing sides are provided interior to sides 100 and 101. This is depicted in FIGS. 4A-4C, which show the shape and positioning of ribs 300, which support fairing side 101. Ribs of minor image design (not shown) are provided for fairing side 100. The ribs can be fastened to the front face 21 of box of Trailer 20 with screw fasteners, nuts and bolts, and the like.

It is customary for Truck operators to balance the weight and load on each of the Truck's axles for each load carrying trip. This is accomplished in part by moving the position of the devices connecting the Truck's trailer to its tractor.

The device on a Truck's tractor that attaches the trailer to the tractor is called the "fifth wheel." The device on the trailer that attaches the trailer to the Truck's tractor is called the "king pin."

To permit adjustment for the load, a Truck's tractor's fifth wheel typically can be moved forward/rearward about twenty inches. Such movement correspondingly increases/decreases the Gap between a Truck's tractor and trailer about twenty inches as the fifth wheel moves forward/rearward. To accommodate this movement of the fifth wheel, any aerodynamic devices addressing Gap drag must be small enough to fit within the space comprising the Gap when the Truck's tractor's fifth wheel is in the forward-most position.

As mentioned above, during operation it is customary for a Truck's tractor to turn up to, and sometimes more than, 120 degrees, relative to the trailer. The effect of such movement is depicted in FIG. 6; in particular, it can be seen that the area comprising the gap shrinks as the trailer pivots on the fifth wheel and the front corner of the trailer box swings through the area formerly comprising the box.

As a result of the normal Truck operations just described, any aerodynamic devices addressing Gap drag must be small enough to fit within the narrowest space resulting from such movements, expand/contract to accommodate the changing size of the space comprising the Gap, or otherwise adapt so as not to impede normal Truck operations.

In opposition to the need to limit the size of a fairing intended to reduce Gap drag as described above, increasing the size of the fairing enhances its aerodynamic efficiency. The present invention overcomes this dilemma in the manner described below.

In the preferred embodiment of the present invention, components 100, 101, and 110 possess a thickness (measured from front to back, with "front" being the edge nearest the tractor and "back" being the edge abutting the box of Trailer 20) nearly equalling the distance, measured from the back of the tractor's cab box to the front 21 of the box of Trailer 20, when (i) the trailer is in its maximum forward position on the tractor's fifth wheel and (ii) the Truck's tractor and trailer are aligned in a straight line such that the centerlines of the Truck's tractor and trailer are co-linear.

The portions of the present invention comprising fairing sides 100 and 101 are optionally made of a resilient material that i) will not damage appendages of the tractor in the Gap if the tractor is turned to its maximum position relative to the trailer, as described above, and ii) will not be damaged by such contact. Suitable resilient materials include flexible polyvinylchloride. In the event such resilient properties are not desired, particularly in view of the other features of the invention described herein, fairing sides 100 and 101 can be made of any sheet material suitable for exterior vehicular use, including aluminum, steel, rigid plastics and the like.

Further, as depicted in FIGS. 4A-4C, fairing sides 100 and 101 in the preferred embodiment of the present invention are supported on elastically deformable ribs 300 that elastically bend and then "spring back," with no permanent deformation, if the tractor is turned to its maximum position relative to the trailer. As a result, if such portions of the airfoil come into contact with any portion or appendage of the Truck's tractor, they "bend away" without damage to the tractor or the fairing structure. Additionally, in the preferred embodiment of the present invention, the elastically deformable ribs 300 are mounted on hinges to permit further bending away from obstructions on the Truck's tractor. Ribs 300 can be fabricated of strip stock aluminum, steel or the like, to impart the elastically deformable characteristic described herein.

In particular, a plurality of spaced-apart ribs 300 are fastened to fairing sides 100 and 101 and to the front surface 21 of the box of Trailer 20 with a plurality of optionally spring-loaded hinges 310. Hinges 310 are optionally spring-loaded to urge fairing sides 100 and 101 to rotate to an "open" position. In this particular embodiment, fairing sides 100 and 101 extend rearwardly to overlap the vertical sides of the box of Trailer 20, in order to limit the degree to which fairing sides 100 and 101 rotate open, so that fairing sides 100 and 101 assume a functional aerodynamic shape. However, in the event that either fairing side is pressed against by the Truck's tractor, the hinged mounting arrangement allows them to bend away without damage, yet assume their original proper shape after the tractor assumes a straight-ahead position.

In the embodiment shown in FIGS. 4A-4C, fairing sides 100 and 101 are divided into upper and lower segments, wherein each segment can be deflected or "bent" independent of the other, in order to facilitate bending. Thus fairing side 100 comprises upper segment 162 and lower segment 161, and fairing side 101 comprises upper segment 142 and lower segment 141.

A similar mounting arrangement, using spaced-apart ribs fastened with spring-loaded hinges to the front surface 21 of the box of Trailer 20, can be utilized for fairing top 110, if desired.

Resilient structures, hinged structures, or the properties of the fairing material itself, either singly or in combination, may be used to achieve the required ability to deform and "spring back" when fairing structures 100 and 101 impinge upon obstructions on the Truck's Tractor.

It is additionally customary during operation for a Truck's tractor to rotate or pivot up or down relative to the trailer when entering a ramp, driveway access road, or when the Truck encounters some other change in road geometry. The effect of such an upward pivot or rotation, as shown in FIG. 5, is that the area comprising the Gap at the top of the Truck's tractor cab and the top 22 of the Truck's trailer box narrows. As a result, any aerodynamic devices addressing Gap drag must either be small enough to fit within the narrowest space resulting from such movements, or expand/contract to accommodate the changing size of the space comprising the Gap. Additionally, in order to avoid the risk of fire or damage to the fairing resulting from proximity to or actual contact with the Truck's tractor's exhaust pipe(s) (which are often hot at their highest points where catalytic converters or other hot antipollution devices are often mounted), any aerodynamic device must possess heat resistant properties in this area.

Accordingly, in the preferred embodiment of the present invention, the top corner sections of the airfoil comprising the present invention are fabricated of or sheathed with a heat resistant and non-flammable material such as aluminum or sheet steel (examples of which include but are not limited to chrome plated steel or stainless steel). Specifically, as shown in FIG. 4, the upper portions of fairing sides 100 and 101, and the outer portions of fairing top 110, are fabricated of or sheathed with a heat resistant and non-flammable material, collectively designated 200 in the figures. Notably, the balance of fairing top 110, as well as fairing sides 100 and 101, can be constructed of the resilient material described above, and thus still impart the resilient characteristics described above to the fairing structure as a whole, notwithstanding the presence of components 200, which by virtue of their heat resistant and non-flammable characteristics, might not possess the same resilient characteristics.

Further, depending upon the exhaust stack and catalytic converter configuration of the particular tractor, it can be possible to include heat resistant and non-flammable material only on one or both of the upper portions of fairing sides 100 and 101, dispensing with such material on the fairing top 110. Likewise, depending upon the exhaust stack and catalytic converter configuration, it can be possible to include heat resistant and non-flammable material only on one or both of the outer portions of fairing top 110, dispensing with such material on the fairing sides 100 and 101.

Furthermore, it is customary for attachment mechanisms for the hoses, cables and other connectors between a Truck's tractor and trailer ("Glad Hands") to be located along the side of the front face 21 of the box of Trailer 20 at a height reachable by the Truck's operator when standing on the ground. If so located, fairing sides 100 and 101 of the preferred embodiment of the present invention must either end above the Glad Hands to permit access to the Glad Hands from the ground by the Truck's operator, or an access door must exist in fairing sides 100 and 101. Thus the preferred embodiment of the present invention includes access doors in fairing sides 100 and 101 (not shown in the FIGS.).

What is claimed is:

1. A fairing structure for a vehicle having a front vehicular component and a rear vehicular component in tandem and separated by a gap, comprising:
    a top fairing surface adapted to be attached to the rear vehicular component;
    a first side surface adapted to be attached to the rear vehicular component, joining a first end of the top surface and generally perpendicular to the top surface;
    a second side surface adapted to be attached to the rear vehicular component, joining a second end of the top surface opposite the first end and generally perpendicular to the top surface;
    each of the top and first and second side surfaces having a proximal edge adapted to be positioned adjacent a vehicle;
    each of the top and first and second side surfaces having a distal edge adapted to be positioned away from the vehicle with respect to the respective proximal edge;
    wherein the proximal edges of the top and side surfaces attach to the leading top and side edges, respectively, of the front surface of the rear vehicular component, so that an approximately uninterrupted surface is formed from the fairing structure to top and sides of the rear vehicular component;
    wherein an area bounded by the distal edges of the surfaces is smaller than an area bounded by the proximal edges; and
    wherein the top side surface, the first side surface and the second side surface are resilient in the regions distal from the regions where the first side surface joins the top side surface, and where the second side surface joins the top side surface.

2. A fairing structure as in claim 1, wherein the top side surface comprises a heat and fire resistant material in the regions proximate to the first and second side surfaces.

3. A fairing structure as in claim 2, wherein the first and second side surfaces comprise a heat and fire resistant material in the regions proximate to the top side surface.

4. A fairing structure as in claim 1, wherein the first and second side surfaces comprise a heat and fire resistant material in the regions proximate to the top side surface.

5. The fairing structure of claim 1, further including an access door in each of the first and second side surfaces.

6. A fairing structure for a vehicle having a front vehicular component and a rear vehicular component in tandem and separated by a gap, comprising:
    a top fairing surface adapted to be attached to the rear vehicular component;
    a first side surface adapted to be attached to the rear vehicular component, joining a first end of the top surface and generally perpendicular to the top surface;
    a second side surface adapted to be attached to the rear vehicular component, joining a second end of the top surface opposite the first end and generally perpendicular to the top surface;
    each of the top and first and second side surfaces having a proximal edge adapted to be positioned adjacent the rear vehicular component;
    each of the top and first and second side surfaces having a distal edge adapted to be positioned away from the rear vehicular component with respect to the respective proximal edge;

wherein the proximal edges of the top and side surfaces attach to the leading top and side edges, respectively, of the front surface of the rear vehicular component, so that an approximately uninterrupted surface is formed from the fairing structure to top and sides of the rear vehicular component;

wherein an area bounded by the distal edges of the surfaces is smaller than an area bounded by the proximal edges; and wherein the first and second side surfaces are adapted to be hingedly mounted to the rear vehicular component to permit such surfaces to bend away upon contact with the front vehicular component.

7. A fairing structure as in claim 6, wherein the top side surface comprises a heat and fire resistant material in the regions proximate to the first and second side surfaces.

8. A fairing structure as in claim 7, wherein the first and second side surfaces comprise a heat and fire resistant material in the regions proximate to the top side surface.

9. The fairing structure of claim 6, further including an access door in each of the first and second side surfaces.

* * * * *